INVENTOR.
George W. Harper
Albert R. Catto.
BY Slough and Canfield
ATTORNEY.

Patented Feb. 16, 1937

2,071,165

UNITED STATES PATENT OFFICE 2,071,165

AXLE DRIVE TRANSMISSION

George W. Harper and Albert R. Catto, Cleveland, Ohio, assignors to The Columbia Axle Company, Cleveland, Ohio, a corporation of Ohio Application December 6, 1932, Serial No. 645,968

18 Claims. (Cl. 74—314)

This invention relates to multi-speed power transmission mechanisms for automotive vehicles for transmitting power from the engine to a driving axle at selective speeds.

When the speed ratio of the power transmitting mechanism between the engine and axle of an automotive vehicle is changed while the vehicle is in motion, the line of power transmission is first broken between the engine and the axle; thereupon driven rotary parts which are still connected to the axle continue to be rotated at unchanged speed by the inertia of the car, and when the line of transmission is again established at a different speed ratio the rotary parts forwardly of the axle driven parts (that is, forwardly in the case of a rear axle) must first be increased or decreased in speed correspondingly, that is to say, synchronized, to avoid the shock and strain and deterioration of the mechanical parts which would be caused by suddenly overcoming the inertia of these parts when their speed is suddenly changed by being again connected to the rear axle.

When the change of speed is made at the conventional transmission gear set immediately adjacent to the engine, the parts whose speed must be changed in the gear set are of relatively light weight and small negligible inertia; and the difference between the speed of these and the other axle-driven parts and the speed of the engine may be absorbed smoothly and without shock by skillful manipulation of the main driving clutch by the driver.

Even in this case, unskillful operation of the clutch in coordination with adjustment of engine speed will, upon engaging the clutch after the selective speed change has been made, send a shock through the entire car and power plant as is well known.

Now, in the case of transmissions having speed change mechanism disposed relatively remote from the engine, for example in the driving axle itself, the manipulation of the main driving clutch is ineffective to prevent the above-mentioned shock because of the inertia of the rotating parts between the axle and the main clutch, all of which must have their speed suddenly changed when the speed ratio in the axle transmission is changed.

Although the instant invention may be applied to various types of transmission mechanism, it is to transmissions of this last defined class that the instant application is particularly applicable.

It is an object of this invention to provide, in a power transmission mechanism having selective speed ratios, an improved means for synchronizing the relatively rotating parts upon selectively changing from one speed ratio to another.

Another object is to provide, for driving axle constructions, a power transmitting mechanism having selective speed ratios and improved means for synchronizing the relatively rotating parts upon selectively changing from one speed ratio to another.

Another object is to provide a power transmission mechanism of the class referred to in which the synchronization is effected through the agency of an improved friction generating or braking device.

Another object is to provide a power transmitting mechanism of the class referred to having improved synchronizing means and in which the power transmission is effected through a dual ratio planetary gearing.

Another object is to provide a power transmitting mechanism of the class referred to having selective speed ratios and synchronizing means and adapted in an improved manner to be operated by engine vacuum.

Another object is to provide, in a power transmitting mechanism having selective speed ratios and means for synchronizing the relatively rotating parts upon selectively changing from one speed ratio to another, an improved means for introducing a time interval during the change from one speed to the other.

Another object is to provide, in a power transmission mechanism having selective speed ratios and means for synchronizing the relatively moving parts upon selectively changing from one speed ratio to another, an improved means for introducing a predetermined time interval between the change from one speed ratio to the other in order that synchronization of the parts may be effected in an improved manner.

Another object is to provide, in a power transmission mechanism having means for providing a time interval as above stated, an improved means for adjustably varying the time interval.

Other objects will be apparent to those skilled in the art to which our invention appertains.

Our invention is fully disclosed in the following description taken in connection with the accompanying drawings, and in which:—

Figure 1:
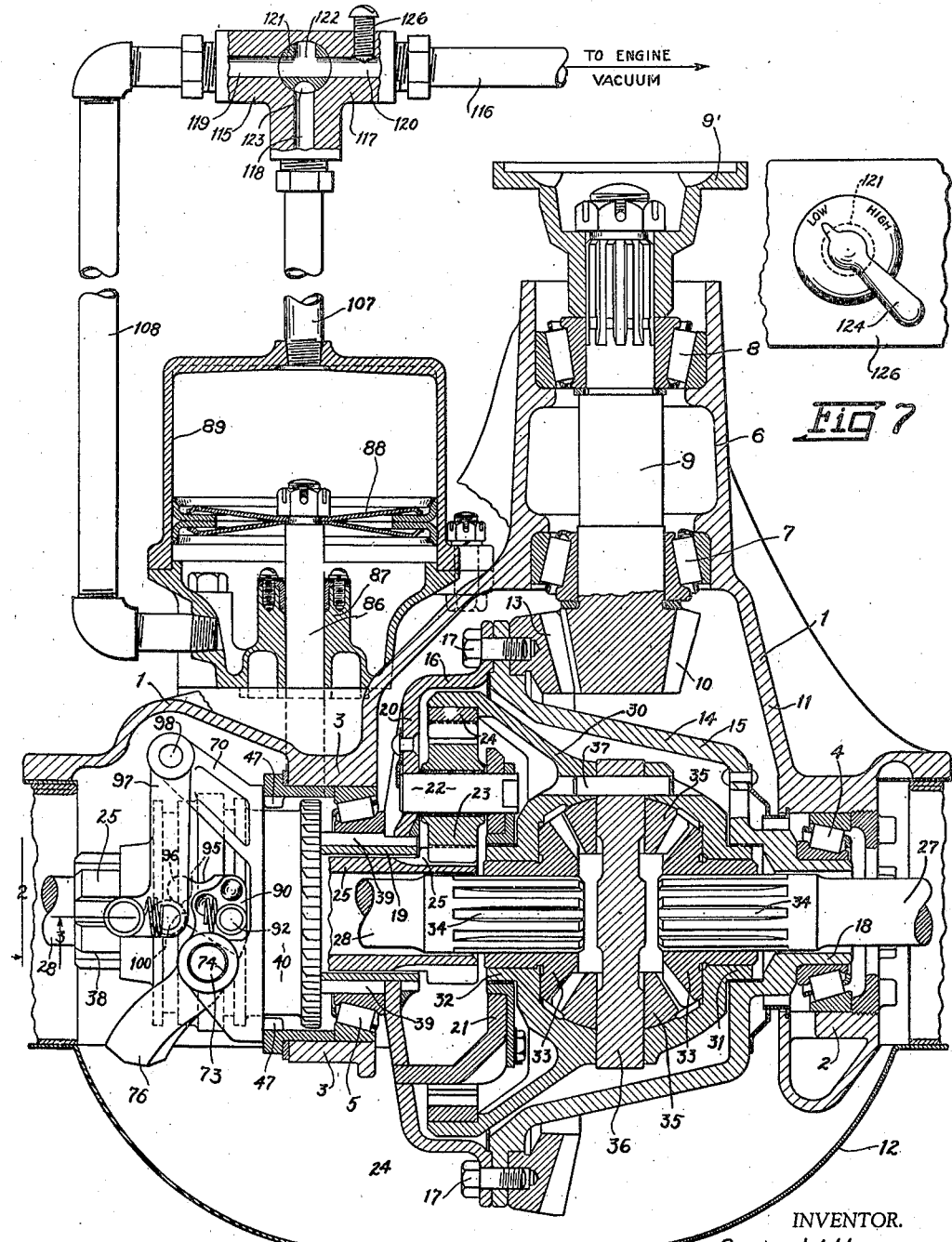
Fig. 1 is a sectional view taken on a substantially horizontal plane through a rear axle power transmitting driving mechanism of the dual ratio planetary type and with an embodiment of my invention applied thereto.
Figure 2:
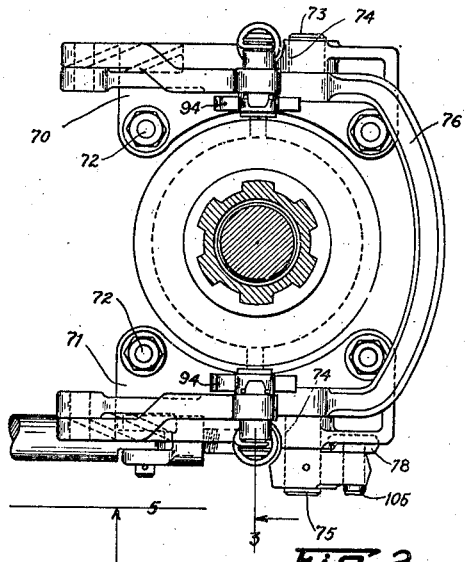
Fig. 2 is a view of a clutch element and shifting mechanism therefor shown in Fig. 1, the view being taken approximately from the plane 2 of Fig. 1.
Figure 3:
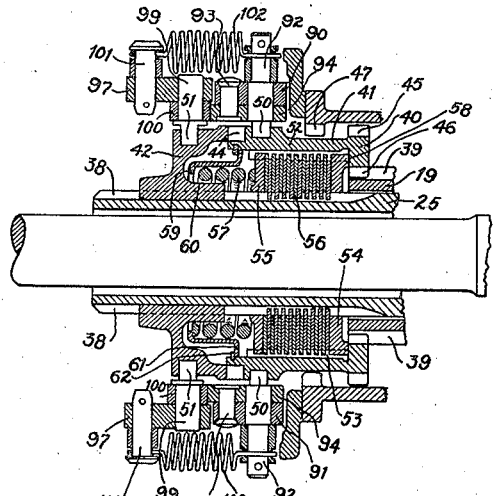
Figure 5:
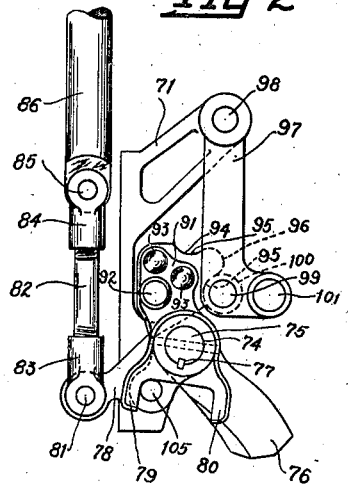
Figure 6:
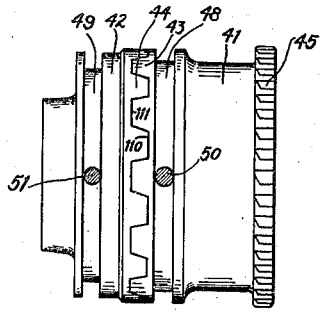
Figure 4:
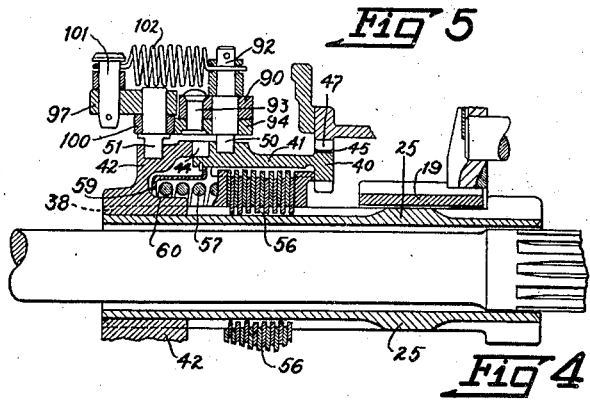

Fig. 3 is a sectional view of a part of the mechanism of Figs. 1 and 2, the view being taken approximately from the plane 3 of Fig. 2 or the plane 3 of Fig. 1;

Fig. 4 is a view of a part of Fig. 3 illustrating the parts in another position;

Fig. 5 is a view of a part of the mechanism of Fig. 1 but taken from the opposite side thereof; or the view Fig. 5 may be considered as taken approximately from the plane 5 of Fig. 2;

Fig. 6 is a view of a clutch element which we may employ, shown separately, and which is illustrated in Figs. 1 to 4 inclusive associated with other elements;

Fig. 7 is a fragmentary view of a control device which I may employ.

Referring to the drawings, we have shown generally at 1 a main housing comprising aligned oppositely extending generally tubular portions 2 and 3 in which upon suitable roller bearings 4 and 5 the transmission mechanism to be described is rotatably supported; and comprising a forwardly extending tubular portion 6 in which upon suitable roller bearings 7 and 8 a pinion shaft 9 is rotatably mounted and terminating forwardly and outwardly of the tubular portion 6 in a coupling means 9' adapted to be coupled to the propeller shaft extending rearwardly from the engine, and terminating inwardly of the housing in a bevel pinion 10; and the housing 1 comprises a central portion 11 generally housing the pinion 10 and associated transmission elements; and rearwardly, the housing is open but is provided with a cover plate 12 to complete the housing and effect a complete enclosure for the parts of the mechanism.

The pinion 10 meshes with a ring gear 13 rigidly connected to and supported upon a rotatable housing 14 preferably formed from two generally cup-form portions 15 and 16 joined together and to the ring gear by a circular series of bolts 17—17. The housing portions 15 and 16 have, respectively, coaxially outwardly extending tubular portions 18 and 19 by which the rotatable housing 14 is rotatably supported in the above-mentioned bearings 4 and 5.

The rotatable housing portion 16 has a portion 20 disposed transversely of its rotational axis and is provided with a corresponding transversely disposed partition element 21 inwardly axially spaced from the portion 20; and connecting the portions 20 and 21 is a plurality, such as five (only one of which is shown), of gear shafts 22 disposed parallel to the rotational axis and radially spaced therefrom, and rotatably supporting a corresponding plurality of planetary gears 23.

The planetary gears 23 mesh outwardly radially with the teeth of an internally toothed orbit gear 24, to be more fully described, and inwardly radially the planetary gears mesh with the teeth of a sun gear 25.

As will presently be more readily apparent, means is provided optionally to connect the sun gear 25 with the tubular portion 19 of the housing 14 whereupon, when power from the engine is transmitted through the shaft 9, pinion 10 and ring gear 13 to rotate the housing 14, the planet gears 23 will move bodily with the housing and not rotate upon their shafts 22, and thus the orbit gear 24 will move bodily or in unison with the housing 14 and through the agency of the differential mechanism to be described will rotate the axle shafts 27 and 28 to propel the car at one speed. And, as will become more readily apparent, means is also provided to optionally or selectively connect the sun gear 25 with the stationary housing; whereupon, as the ring gear 13 and housing 14 are rotated, the planet gears 23 will revolve around the sun gear and thus move their orbit gear at a speed greater than that of the housing 14 and drive the axle shafts 27 and 28 at another and higher speed.

The movement of the orbit gear 24 is transmitted to the axle shaft as above referred to in the following manner. The teeth of the orbit gear are carried on a spider 30 having oppositely axially extending tubular portions 31 and 32 rotatably mounted in corresponding bearing bores in the tubular portion 18 and in the partition element 21. A pair of differential bevel gears 33—33 are splined upon splines 34—34 of the axle shafts and have their teeth meshed with a pair of differential pinions 35—35 rotatably mounted upon a pinion shaft 36 extending centrally through the spider 30 and secured therein by a pin 37, and the bevel gears 33—33 are rotatably supported by their hubs in the tubular portions 31 and 32.

The transmission mechanism, as thus far described, is generally similar to that forming the subject matter of the patent issued to A. A. Wiedmaier, No. 1,815,689, July 21, 1931, and in view of the more complete description of construction and operation in that patent, it is believed that the foregoing brief description will suffice.

In the transmission mechanism of that patent, and with respect to which the present invention is in some respects an improvement, the optional or selective positive connection of the sun gear 25 with the rotatable housing 14 or with a portion of the stationary housing to change the transmission from one ratio to the other is effected directly and abruptly.

Mechanism forming part of our invention embodiment will now be described whereby this selective connection is first made through a synchronizing clutch mechanism to synchronize the relative rotational speeds of the sun gear 25 and the housing 14, or of the sun gear and the stationary housing before the connection is made positive, to absorb or prevent the shock which would otherwise be transmitted to the mechanism and to the vehicle by the sudden change of positive transmission ratio between the axle shafts 27 and 28 and the shaft 9.

The sun gear 25 is elongated axially in the direction away from the teeth engaged with the pinion 23 and is provided with external splines 38—38 integral therewith (see Fig. 3).

The tubular portion 19 of the housing 14 is provided with external splines 39—39. A shiftable clutch element 40, shown separately in Fig. 6 and in cross-section in Fig. 3, is provided, consisting of two parts 41 and 42, which are axially movable relative to each other. The parts of the clutch are mutually engageable by annular rows of confronting clutch teeth 43 and 44, respectively, adapted to be meshed upon axial movement toward each other and unmeshed by axial movement in the other direction.

The clutch part 42 is splined upon the splines 38 of the sun gear 25. The clutch part 41 is provided with an external set of clutch teeth 45 and an internal set of clutch teeth 46, the teeth 46 being adapted to be meshed with the splines 39 (see Fig. 3) upon axial movement of the clutch part 41 inwardly or toward the right as viewed in Fig. 3 and to be disengaged from the splines 39 by movement in the other direction. The clutch teeth 45 are adapted to be engaged with an annular row of clutch teeth 47 provided on the tubular portion 3 of the stationary housing, (see Figs. 1 and 3) upon movement of the clutch teeth 45 outwardly or toward the left as viewed in Fig. 3 and disengaged upon movement toward the right.

The clutch part 41 has an annular external groove 48 therein and the clutch part 42 a groove 49 into which project, respectively, trunnions 50 and 51 of a clutch shifting mechanism to be described later.

At this point of the description it is believed sufficient to say that the trunnions 50—50 and the trunnions 51—51 may be moved toward the left or the right as viewed in Fig. 3 to move the clutch parts 41 and 42 to engage and disengage the teeth 44 and 43, 45 and 47, and the teeth 46 and splines 39, and the sequence of these movements will presently be described.

The clutch part 41 has a cylindrical body portion 52 between the clutch piece 45 and 43 thereof and which is provided with internal axially disposed splines 53. A pair of head plates 54 and 55 have peripheral teeth or splines engaged with the splines 53 and the plates 55 and 54 are centrally perforated and rotatably mounted upon the splined sun gear 25.

Between the head plates 54 and 55, is a plurality or pile of brake discs preferably alternatively of brass and steel or like different materials, and shown generally at 56. The discs of brass are peripherally splined or toothed to engage the splines 53, and are centrally perforated to have rotational relation to the sun gear 25; and the alternate steel discs are of slightly smaller diameter peripherally to clear the splines 53 and are centrally perforated and splined to engage the splines 38 of the sun gear 25. A compression spring 57 is disposed to exert axial thrust upon the head plate 55 from which it is transmitted through the pile of discs 56 to create friction therebetween, and thence to the head plate 54. The head plate 54 is formed to engage an annular shoulder on the clutch part 40 as at 58.

The spring 57 at its outer end reacts upon the bottom of a cup-form cage 59, the bottom of which is perforated to clear a hub portion 60 of the clutch part 42 and which hub portion is splined on the splines 38, and the open end of the cup is outwardly flanged as at 61 and lodged behind a shoulder 62 on the body portion 52 of the clutch part 41.

By this construction, as will be observed, the clutch part 41 may be moved to the right or toward the left as viewed in Fig. 3 and carry with it its brake plates 56 and spring 57 maintaining the plates under compression; and during such axial shifting movement, the steel plates may slide in the splines 38.

The operation of the device as thus far described will be explained and then will follow a description of the operating mechanism by which the trunnions 50 and 51 are moved to effect the said operation.

With the parts in the position illustrated in Fig. 3, the sun gear is locked to the hub portion 19 and the transmission is at the low speed ratio, the said locking engagement being traceable in Fig. 3 from the sun gear 25, splines 38, clutch part 42, engaged teeth 44, 43, clutch part 41, and teeth 46 engaging the splines 39 of the tubular portion 19.

To shift to the higher speed and at the same time to synchronize the parts to avoid shock as hereinbefore described, the two trunnions 50 and 51 are simultaneously moved toward the left as viewed in Fig. 3 but with the trunnion 51 moving faster than the trunnion 50. The trunnion 50 will move the clutch part 41 toward the left and cause the tooth 46 to begin to leave the ends of the splines 39. By the time the teeth are half way out of the splines 39, the teeth 44 have been completely disengaged from the teeth 43 by the more rapid movement of the trunnion 51 axially moving the clutch part 42. The clutch part 41 continues to move and will presently engage the teeth 47.

Assuming, of course, that the vehicle is moving forwardly, the axle shafts (see Fig. 1) 27 and 28 will be rotating even if power supply from the engine is discontinued, and the axles, acting through the differential spider 30, orbit gear 24 and pinions 23, will rotate the sun gear 25. Before the teeth 44 and 43 were disengaged as above described, the sun gear rotated the clutch part 41 by means of the clutch part 42 and thus the tubular portion 19 was rotated in unison with the sun gear 25. Upon disengagement of the teeth 44 and 43, as above described, the clutch part 41 will continue to be rotated by the sun gear 25 through the friction of the discs 56.

As the clutch part 41 now moves toward the left, the teeth 46 leave the splines 39, the clutch part 41 continuing to rotate and presently the teeth 45 engage the teeth 47 and intermesh approximately halfway therewith. The clutch part 41 is thus abruptly stopped from rotating. But it will be observed that the sun gear 25 and the clutch part 42 splined therewith may continue to rotate by slipping the discs 56 with a braking action so that they are gradually and without transmitting shock to the mechanism brought to rest.

As the trunnion 50 continues to move to fully engage the teeth 45 and 47, the trunnion 51 moves back toward the right and ultimately engages the teeth 44—43 which are now substantially without relative movement. From this time on, the sun gear may be considered as locked to the stationary frame through the spline 38, clutch part 42, teeth 44—43, clutch part 41 and teeth 45, 47.

The parts are now in the position illustrated in Fig. 4 and at the higher speed ratio.

To shift back to the lower speed ratio, the process is just reversed, that is to say, the trunnion 50 starts to move toward the right and the trunnion 51 moves towards the left; the teeth 44—43 are first disengaged; the teeth 47 and 45 are then disengaged; the teeth 46 engage the splines 39 at a time when the tubular portion 19 is rapidly rotating; the clutch part 41 is suddenly set into motion but shock is prevented by slipping of the plates 56; the driving action of the plates gradually brings the sun gear up to the velocity of the rotating clutch part 41 and then as the teeth 46 move into full engagement with the splin 39, the trunnion 51 moves toward the right and engages the teeth 44—43 so that the connection between the sun gear 25 and tubular portion 19 will not continue to be through the slippable discs but through the positive lock of the teeth 44—43 and spline 38.

Thus in shifting from either the low speed to the high speed or vice versa, the change of mechanical connections is first made momentarily or temporarily through a slipping brake connection to synchronize the speed of the relatively moving parts, and this is presently supplemented by a positive connection for the purposes hereinbefore set forth.

To move the trunnions 50 and 51 with the sequence of movement above described, the following mechanism is provided.

A pair of brackets 70 and 71 are rigidly secured as by bolts 72—72 to the stationary housing and provided with aligned bores 74—74 in which are oscillatably mounted oppositely extending trunnions 73 and 75 formed at the open ends of a generally U-shaped yoke 76.

The trunnion 75 has keyed thereto as at 77 a lever 78 provided with a pair of spaced fingers 79 and 80 and terminating in an eye provided with a bearing pin 81. A link 82 having forks 83 and 84 at its opposite ends is connected by the fork 83 to the pin 81 and by the fork 84 to a bearing pin 85 on the rearward end of a piston rod 86 reciprocable in a bearing guide 87 formed integral with or rigidly connected to the main housing 1.

As illustated in Fig. 1, the piston rod 86 is connected to a piston 88 reciprocable in a cylinder 89. A conduit 107 is provided to apply intake suction of the automotive engine to the cylinder 89 on one side of the piston 88 and a similar conduit 108 to apply suction to the cylinder on the other side of the piston whereby the piston may be caused to exert, optionally, thrust on the piston rod 86 forwardly or rearwardly; and the piston rod movement is communicated to the tunnion 75 to oscillate the yoke 76.

The yoke 76 has portions extending beyond each of the trunnions 73 and 75, indicated at 90 and 91, to which pins 92—92 are rigidly secured having on their inner confronting ends the trunnions 50—50 above described, and thus the motion above described for the trunnion 50 will be given thereto by the oscillatory movement of the yoke 76.

To the portions 90 and 91 are also riveted as at 93—93, cam plates 94—94 having a pair of recesses 95—95 and an intermediate projection 96. A pair of hangers 97—97 are hinged as at 98—98 to the brackets 70—71 and in their free ends are provided with pins 99—99 rigidly secured thereto upon which are formed the trunnions 51—51 above described.

The pins 99 are preferably provided with relatively rotatable roller elements 100—100 disposed to be engaged by the cam element 94.

The hangers 97 are provided with pins 101—101 and tension springs 102—102 connect the pins 101 with the pins 92; and thus the roller elements 100 are always maintained in pressure contact with the cams 94.

By reference to Figs. 1 and 5, it will now be apparent that when the yoke 76 is oscillated in one direction, that is to say, from the position illustrated, the pins 92 carrying the tunnions 50—50 will be moved correspondingly and the cam projection 96 will move in behind the roller element 100 and move it and the pin 99 outwardly in the same general direction as the pin 92 is moving but with a more rapid movement and that upon continued oscillation of the yoke 76, the pin 92 will continue to move in the same direction but the roller 100 will roll down from the projection 96, and the projection 96 will be projected under the roller permitting the pin 99 to have a retracted movement toward the pin 92; and thus the above described necessary movement of the trunnions 50 and 51 will be accomplished.

On the return oscillatory movement of the yoke 76, the pin 92 will first have a movement away from the pin 99 and the pin 99 a movement away from the pin 92 as the roller 100 rolls over the projection 96 in the other direction, followed by a movement of the pin 99 toward the pin 92, thus accomplishing the reversed suitable movement of the trunnions 50 and 51 above described.

To insure that the trunnions 50 and 51, after their clutch shifting movement has been accomplished, will not drag or frictionally engage the sides of their grooves 48 and 49, the movement of the yoke 76 in either direction is predetermined and stopped with the trunnions 50 and 51 centrally of their grooves by the fingers 79 and 80 moving in unison with the yoke 76 into engagement in either direction with a stationary pin 105, (see Fig. 5) on the bracket 71.

The conduits 107 and 108 lead to a control valve device 115 by which either conduit 107 or 108 may, optionally or selectively, be connected to an engine vacuum supplying conduit 116.

Any well known type of valve construction may be employed to make this alternative connection. In the drawings I have illustrated one form comprising a three-way valve housing 117 having ducts 118, 119 and 120, respectively, communicating with the conduits 107, 108 and 116, and a rotary valve element 121 having a three-way or T-form duct 122 therein. The valve element 121 has a communication with the atmosphere through a port 123.

It is believed that in the well developed state of this art, this brief description and showing will be understood to those skilled in this art in connection with the following mode of operation.

As illustrated, vacuum is supplied by the conduit 108, to the lower side of the piston, and the upper side of the piston communicates with the atmosphere through the duct 118 and the port 123.

By rotating the valve element 121 clockwise as viewed in Fig. 1 through 90°, communicating with the atmosphere through the port 123 will be effected by way of the conduit 108 with the cylinder on the lower side of the piston, and the upper side of the piston will communicate with the vacuum and in through the conduit 107, duct 118, duct 122 and duct 120.

A control device illustrated in Fig. 7, for operating the valve element 121 and having "low" and "high" indicia to indicate low speed and high speed may be provided comprising an operating handle therefor, 124 and adapted to be mounted upon a panel 125 of the car or vehicle.

Obviously, the rate at which the parts of the speed change device above described are moved from one position to the other by the stroke of the piston 88, will be determined by the rate of flow of air into the cylinder 89 on one side or the other of the piston 88 as the case may be. This rate of flow may normally be determined by the size of the conduits 107 and 108 or other portions of the path of flow, but in order to render the same adjustable, a screw 126 may be provided in the valve device 115 which, by screwing it inwardly or outwardly may decrease or increase the effective size of the duct 120 to adjust the rate of flow through the conduit system, and thus adjust the length of the time interval of movement of the parts from the position which they occupy at one speed to that which they occupy at another speed.

Advantages of the above described mechanism and its mode of operation may be stated in another way, as follows:

When the vehicle is in motion, the housing 15—16 rotates together with its associated parts including the planet gears 23, ring gear 13 and pinion 10 and other parts forward thereof (that is, forwardly in the case of rear axle drive); and the housing 30 is also rotating together with its associated parts including the orbit gear 24, differential gears and axles. When the planetary gearing is in the low speed ratio, these two housings are rotating at the same speed and are connected by the engaged orbit gear and planetary gear. When the shift or change is made to the higher speed, the housings are first disconnected and the housing 30 goes on rotating at the same speed, being now driven by the axles; and the housing 14—16 must first be slowed down to synchronize it with the housing 30 before the two can be drivingly connected together at the higher speed ratio; this slowing down action is effected through the friction brake as described; when the change is made back to the low speed ratio, the housing 14—16 (and associated parts) must be speeded up to synchronize it with the axle-driven housing 30, before being drivingly connected to it, and this again is effected by the sliding connection or friction brake.

In the operation of the invention above described, in some instances, the two parts may not be brought into exact synchronism at the time that the teeth 44 return to engagement with the teeth 43. These teeth are therefore made with flat confronting faces 110 and 111, respectively, whereby they may slide over each other until the desired synchronism has been effected. It will be observed that the springs 102—102 will yield as may be necessary to resiliently constrain the two clutch parts 41 and 42 toward each other until their teeth 43—44 engage.

In the foregoing we have described an embodiment of our invention as applied to the rear axle of an automotive vehicle of the more usual or popular construction. But our invention is not limited to this application thereof and may be applied to a front axle or to both axles.

Our invention is not limited to the exact details of construction shown and described. Many changes and modifications thereof may be made within the scope and spirit of our invention without sacrificing its advantages.

We claim:—

1. In a power transmission mechanism for automotive vehicles to transmit engine power to a vehicle driving axle, a pair of axle elements, differential gearing connecting the axle elements, a first gear for driving the axle elements through the differential gearing, and a second gear for receiving power from the engine, multi-speed-ratio transmission gearing between the first and second gears, comprising a planet gear associated with the second gear and meshed with the first gear and a sun gear meshed with the planet gear, and speed change means comprising means to optionally connect the sun gear to a stationary housing portion of the vehicle or to the second gear, and synchronizing means to gradually synchronize the speed of the second gear with the first gear during the changing of speed ratio.

2. A power transmitting mechanism as described in claim 1 and in which the synchronizing mechanism comprises a pair of frictionally engaged brake elements one of which is associated with the sun gear and the other of which is optionally associatable with the second gear or with the said stationary portion of the vehicle housing.

3. A power transmission mechanism as described in claim 1 and in which the synchronizing mechanism comprises a pile of frictionally engaged brake discs, alternate ones of the discs being connected with the sun gear and the other alternate discs adapted to be optionally connected to the second gear or to the said stationary portion of the vehicle housing, and resilient means to resiliently compress the discs one upon the other.

4. In a power transmitting mechanism for automotive vehicles to transmit engine power to a vehicle driving axle, a pair of driving axle elements, differential gearing connecting the axle elements, a first gear for driving the axle elements through the differential gearing, and a second gear for receiving power from the engine, multi-speed-ratio transmission gearing between the first and second gears comprising a planet gear associated with the second gear and meshed with the first gear, and a sun gear meshed with the planet gear, speed ratio change mechanism comprising a first clutch element having a frictional engagement with the sun gear and adapted to be shifted to optionally connect with a stationary portion of the vehicle or with the second gear, a second clutch element rigidly rotatably connected to the sun gear and adapted to be rigidly connected with and disconnected from the first clutch element.

5. In a power transmitting mechanism for automotive vehicles to transmit engine power to a vehicle driving axle, a pair of driving axle elements, differential gearing connecting the axle elements, a first gear for driving the axle elements through the differential gearing, and a second gear for receiving power from the engine, multi-speed-ratio transmission gearing between the first and second gears comprising a planet gear associated with the second gear and meshed with the first gear, and a sun gear meshed with the planet gear, speed ratio change mechanism comprising a first clutch element having a frictional engagement with the sun gear and adapted to be shifted to optionally connect with a stationary portion of the vehicle or with the second gear, a second clutch element rigidly rotatably connected to the sun gear and movable into rigid connection with the first clutch element or out of connection therewith, and actuable means for successively disconnecting the clutch elements, shifting the first clutch element and connecting the clutch elements.

6. A transmission mechanism as described in claim 5 and in which the actuable means comprises a pair of oscillatable elements, having each a sliding connection with one of the clutch elements respectively, a cam on one oscillatory element engaging a cam follower on the other, whereby oscillatory movement of one of the oscillatory elements will oscillate the other, and the cam being so formed that upon movement of the said one oscillatory element in either direction, the other oscillatory element is caused first to move relatively away from the said one oscillatory element and subsequently toward it.

7. A transmission mechanism as described in claim 5 and in which the actuable means comprises a pair of oscillatable elements, having each a sliding connection with one of the clutch elements respectively, a cam on one oscillatory element engaging a cam follower on the other, whereby oscillatory movement of one of the oscillatory elements will oscillate the other, and the cam being so formed that upon movement of the said one oscillatory element in either direction, the other oscillatory element is caused first to move relatively away from the said one oscillatory element and subsequently toward it, and means for moving the said one oscillatory element comprising a piston and cylinder device connected thereto and actuatable by engine vacuum in the cylinder to communicate oscillatory movement thereto.

8. In a power transmission mechanism for automotive vehicles adapted to transmit engine power to the vehicle driving axles, multi-speed ratio transmission gearing comprising a rotary element connected to the axles to transmit power thereto, and a rotary element connected to the engine and to the first named element to receive power from the engine to transmit it to the axles through the first named element at a selected speed ratio of transmission, mechanism to change the speed ratio of transmission of the two elements from one transmitting speed to another speed, mechanism for automatically causing a predetermined time interval to elapse during the change which includes a reciprocatory piston and cylinder device alternatively and optionally operable by application of engine vacuum thereto, and said mechanism also producing a synchronizing effect upon the speed of the rotary engine and axle connected element for a fixed fractional portion of the time interval.

9. In a power transmission for automotive vehicles to transmit engine power to a vehicle driving axle, multi-speed ratio transmission gearing comprising a rotary element connecting the axle to transmit power thereto, a rotary element connected to the engine and to the first named element to receive power from the engine and transmit it to the axle and to the first named element at a selected speed ratio of transmission, mechanism to change the speed ratio of transmission of the two elements from one transmitting speed to another speed, mechanism for automatically causing a predetermined time interval to elapse during the change which mechanism includes a piston cylinder device, means for optionally applying engine vacuum to one side of the piston and atmospheric pressure to the other side, means for adjusting the rate of flow of air from the atmosphere to adjust the rate of movement of the piston, said mechanism also producing a synchronizing effect upon the speeds of the rotary engine and axle connected elements for a fixed fractional portion of the time interval.

10. In a power transmission mechanism for automotive vehicles to transmit engine power to a vehicle driving axle, multi-speed-ratio transmission gearing comprising a rotary element connected to the axle to transmit power thereto, and a rotary element connected to the engine and to the first named element to receive power from the engine and transmit it to the axle through the first named element at a selected speed ratio of transmission, mechanism to change the speed ratio of transmission of the elements from one transmitting speed to another speed, and mechanism for automatically causing a predetermined time interval to elapse during the change, said mechanism including a walled chamber having a movable wall connected to the change speed mechanism, means for optionally connecting the chamber on one side of the wall with the engine vacuum and the chamber on the other side of the wall with atmospheric pressure to effect movement of the movable wall, and a connection between the movable wall and the speed change mechanism, said mechanism also producing a synchronizing effect upon the speeds of the rotary engine and axle connected elements for a fixed fractional portion of the time interval.

11. In a power transmission mechanism for automotive vehicles to transmit engine power to a vehicle driving axle, multi-speed-ratio transmission comprising a rotary element connected to the axle to transmit power thereto, and a rotary element connecting the engine to the first named element receiving power from the engine and transmit it to the axle and to the first named element at a selected speed ratio of transmission, mechanism to change the speed ratio of transmission of the two elements from one transmitting speed to another speed, and mechanism for automatically causing a predetermined time interval to elapse during the change, said mechanism including an engine vacuum operated device having a movable wall element connected to the speed change mechanism, and said mechanism also producing a synchronizing effect upon the speed of the rotary engine and axle connected elements for a fixed fractional portion of the time interval.

12. In a power transmitting mechanism for automotive vehicles to transmit engine power to a vehicle driving axle, a first gear for driving the axle, and a second gear for receiving power from the engine, multi-speed-ratio transmission gearing between the first and second gears comprising a planet gear associated with the second gear and meshed with the first gear, and a sun gear meshed with the planet gear, speed ratio change mechanism comprising a first clutch element having a frictional engagement with the sun gear and adapted to be shifted to optionally connect with a stationary portion of the vehicle or with the second gear, a second clutch element rigidly rotatably connected to the sun gear and adapted to be rigidly connected with and disconnected from the first clutch element.

13. In a power transmitting mechanism for automotive vehicles to transmit engine power to a vehicle driving axle, a first gear for driving the axle, a second gear for receiving power from the engine, multi-speed-ratio transmission gearing between the first and second gears comprising a planet gear, and a sun gear and orbit gear meshed therewith, speed ratio change mechanism comprising a first clutch element having a frictional engagement with the sun gear and adapted to be shifted to optionally connect with a stationary portion of the vehicle or to cause the orbit gear, sun gear, and second gear to rotate in unison, a second clutch element rigidly rotatably connected to the sun gear and adapted to be rigidly connected with and disconnected from the first clutch element.

14. In a power transmitting mechanism for automotive vehicles to transmit engine power to a vehicle driving axle, a first gear for driving the axle, and a second gear for receiving power from the engine, multi-speed-ratio transmission gearing between the first and second gears comprising a planet gear associated with the second gear and meshed with the first gear, and a sun gear meshed with the planet gear, speed ratio change mechanism comprising a first clutch element having a frictional engagement with the sun gear and adapted to be shifted to optionally connect with a stationary portion of the vehicle or with the second gear, a second clutch element rigidly rotatably connected to the sun gear and movable into rigid connection with the first clutch element or out of connection therewith, and actuable means for successively disconnecting the clutch elements, shifting the first clutch element and connecting the clutch elements.

15. In a power transmitting mechanism for automative vehicles to transmit engine power to a driving axle, a first gear for driving the axle, a second gear for receiving power from the engine, multi-speed-ratio transmission gearing between the first and second gears comprising a planet gear, and a sun gear and an orbit gear meshed therewith, speed-ratio-change mechanism comprising a first clutch element having a frictional engagement with the sun gear and adapted to be shifted to optionally connect with a stationary portion of the vehicle or to cause the orbit gear, sun gear, and second gear to rotate in unison, a second clutch element rigidly rotatably connected to the sun gear and movable into rigid connection with the first clutch element or out of connection therewith, and actuable means for successively disconnecting the clutch elements, shifting the first clutch element and connecting the clutch elements.

16. In a power transmission mechanism for automotive vehicles to transmit engine power to a vehicle driving axle, an axle element, differential gearing connecting the axle element, a first gear for driving the axle element through the differential gearing, and a second gear for receiving power from the engine, multi-speed-ratio transmission gearing between the first and second gears, comprising a planet gear associated with the second gear and meshed with the first gear and a sun gear meshed with the planet gear, speed change means comprising means to optionally connect the sun gear to a stationary housing portion of the vehicle or to the second gear, synchronizing means to gradually synchronize the speed of the second gear with the first gear during the changing of speed ratio, and means for actuating the speed change means by power of the vehicle engine.

17. In a power transmitting mechanism for automotive vehicles to transmit engine power to a vehicle driving axle, a pair of driving axle elements, differential gearing connecting the axle elements, a first gear for driving the axle elements through the differential gearing, and a second gear for receiving power from the engine, multi-speed-ratio transmission gearing between the first and second gears comprising a planet gear associated with the second gear and meshed with the first gear, a sun gear meshed with the planet gear, speed ratio change mechanism comprising the first clutch element having frictional engagement with the sun gear and adapted to be shifted to optionally connect with a stationary portion of the vehicle or with the second gear, a second clutch element rigidly rotatably connected to the sun gear and adapted to be rigidly connected with and disconnected from the first clutch element, and means operable by the engine for effecting relative movement of the clutch element.

18. In a power transmitting mechanism for automotive vehicles to transmit engine power to a vehicle driving axle, a first gear for driving the axle, and a second gear for receiving power from the engine, multi-speed-ratio transmission gearing between the first and second gears comprising a planet gear associated with the second gear and meshed with the first gear, and a sun gear meshed with the planet gear, speed ratio change mechanism comprising a first clutch element having frictional engagement with the sun gear and adapted to be shifted to optionally connect with a stationary portion of the vehicle or with the second gear, a second clutch element rigidly rotatably connected to the sun gear and adapted to be rigidly connected with and disconnected from the first clutch element, and manually controllable means operable by the vehicle engine for effecting engagement and disengagement of the clutch element.

GEORGE W. HARPER.
ALBERT R. CATTO.